(No Model.) 2 Sheets—Sheet 1.

A. E. LYTLE & B. K. COWLES.
WHEELED SOUNDING TOY.

No. 477,600. Patented June 21, 1892.

Witnesses:
Chas. E. Gorton
L. Vassall

Inventors
Albert E. Lytle, and
Byron K. Cowles
By their Attorney
Chas. C. Tillman (No Model.) 2 Sheets—Sheet 2.

A. E. LYTLE & B. K. COWLES.
WHEELED SOUNDING TOY.

No. 477,600. Patented June 21, 1892.

Witnesses:
Chas. E. Gorton
L. Vassall

Inventors:
Albert E. Lytle and
Byron K. Cowles.
By their attorney
Chas. C. Tillman

UNITED STATES PATENT OFFICE.

ALBERT E. LYTLE AND BYRON K. COWLES, OF CHICAGO, ILLINOIS.

WHEELED SOUNDING-TOY.

SPECIFICATION forming part of Letters Patent No. 477,600, dated June 21, 1892.

Application filed February 19, 1891. Serial No. 382,036. (No model.)

*To all whom it may concern:*

Be it known that we, ALBERT E. LYTLE and BYRON K. COWLES, citizens of the United States, residing at Chicago, in the county of Cook and State of Illinois, have invented certain new and useful Improvements in Bell or Chime Attachments for Vehicle-Wheels, of which the following is a specification.

This invention relates to improvements in alarm bell or chime attachments for wheels; and it consists in certain peculiarities of the construction and novel arrangement of the various parts thereof, as will be hereinafter more fully set forth and specifically specified.

The objects of this invention are to provide a convenient, inexpensive, and effective means of automatically giving an alarm or warning by the striking of a bell or bells on the approach of a vehicle and also to afford an automatic chime for baby-carriages, trundles, &c.

In order to enable others skilled in the art to which our invention pertains to make and use the same, we will now proceed to describe it, referring to the accompanying drawings, in which—

Figure 1:
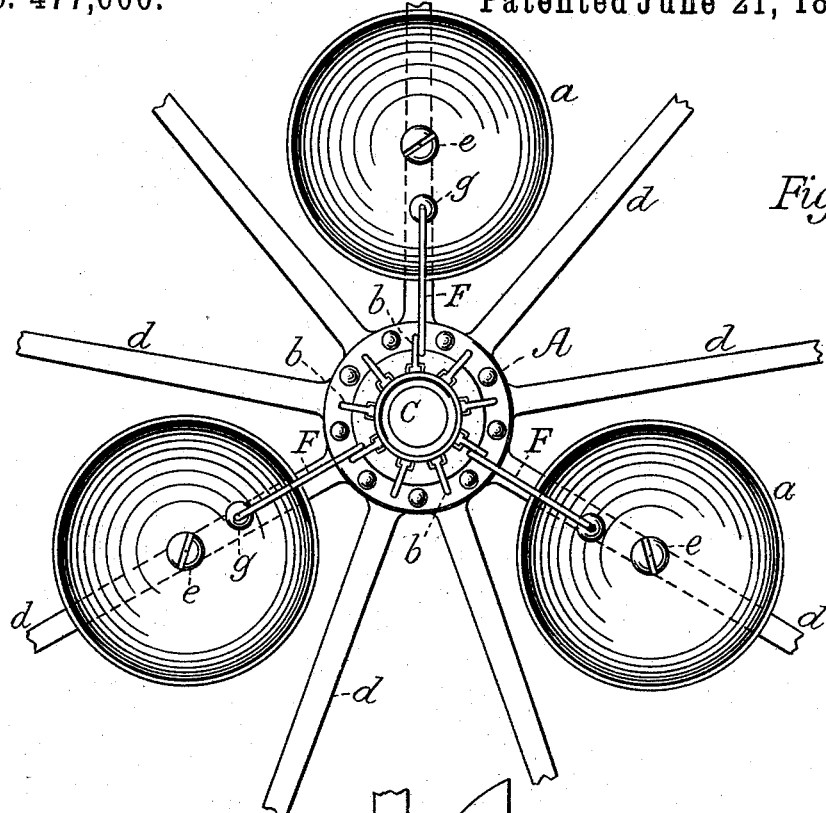
Figure 2:
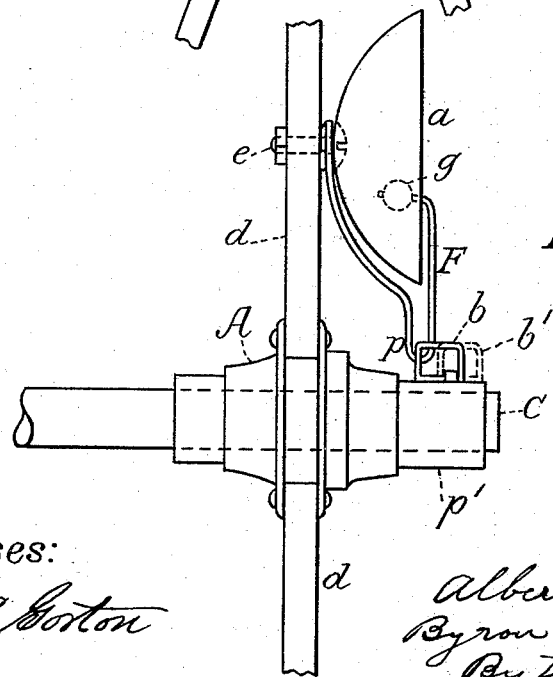
Figure 3:
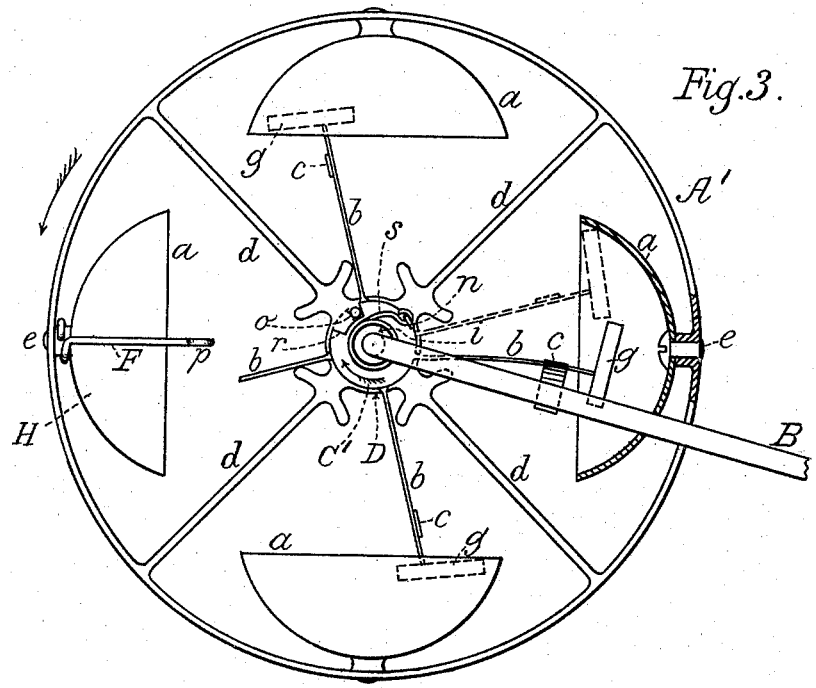

Figure 1 is a face view of a portion of a wheel with the attachments in place. Fig. 2 is a view, in side elevation, of a part thereof. Fig. 3 is a face or front view, partly in section, of a modification; and Fig. 4 is a plan sectional view thereof.

A represents the hub of a wheel, which may be provided with spokes $d$, as in the case of carriage or wagon wheels, and may be made in the form of a car-wheel or otherwise, and is mounted in any desired manner on an axle C, which axle is provided with a number of projections or trips $b$, which are preferably movably secured to the axle in order that they may be thrown out of gear with the other parts when desired. These projections $b$ are usually made of wire and quadrilateral in form, as shown in Fig. 2, and have their lower portions movably secured to the axle or a collar $p'$ around the same, so that when it is desired to prevent the bells ringing on the revolution of the wheel it can be done by moving the trips $b$ from the wheel to the position shown by dotted lines, as at $b'$ in Fig. 2. To the sides of the spokes $d$, when the wheel is constructed with spokes, or to one side of the wheel if a car-wheel is used, is secured by means of screws $e$ a number of bells $a$. Between the outer portion of the bells $a$ and the side of the spokes or wheel and to the screws $e$ is secured one end of the clapper-arm F, which is preferably made of wire, and extends toward the hub or axle to a suitable distance to engage with the trip $b$, and is then bent back upon itself until its free end, upon and to which the clapper $g$ is secured, will be within the cavity of the bell, which clapper is adapted to strike the same by reason of the doubled portion $p$ of the clapper coming in contact with the trip $b$ in the rotation of the wheel.

Figure 4:
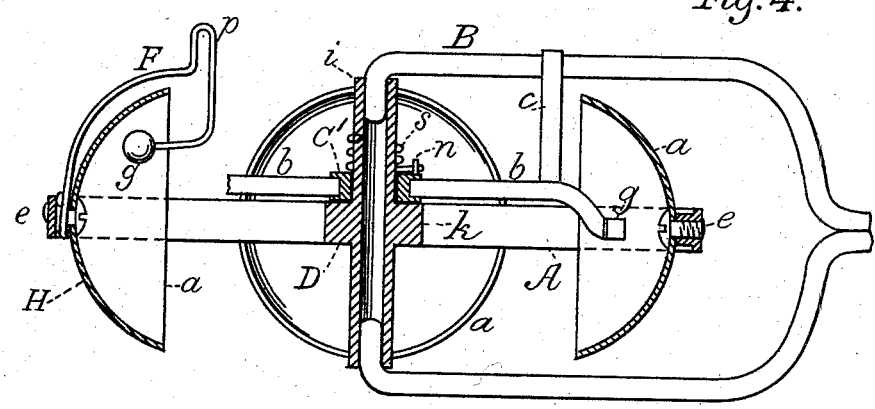

In Figs. 3 and 4 we have shown a modification of our invention which is especially adapted to be used for trundles or other wheels, in which, instead of the clapper-arms being operated by contact with projections on the axle, they are caused to vibrate or strike the bells by means of laterally-extending projections $c$, which are secured to the clapper-arms $b$ and project sufficiently therefrom to come in contact with an obstruction at one side of the wheel, which obstruction in the present case is shown as a bifurcated handle B, which is preferably made of a wire rod having on its free end a wooden handpiece (not shown) and formed at the other end to stride the tire A' and the bells $a$, which in this modification are secured to said tire, and has the end of each fork turned inwardly, as at $i$, to engage in the hollow hub D, thus forming an axle and a trip for the projections $c$, as well as a handle for propelling the wheel. In order that the clappers $g$ may be caused to strike the bells in unison, the clapper-arms $b$ are rigidly secured at their inner ends to a spring-actuated collar C', which is movably secured on the axle D to one side of the spokes $d$ and provided with a recess $r$ in its periphery. At a suitable point on the outside of the collar C' is secured a fastening $n$, to which is attached a spring $s$, which spring is wound around the hub D and has its other end secured thereto. To the enlarged portion K of the hub D is secured a pin $o$, which is within the recess $r$ and acts as a stop to the collar. It is evident that when the projections $c$ meet with the obstruction B the collar C' will yield slightly and that the spring $s$ will be somewhat tightened until the obstruction is passed, when each of the clappers will strike the bells at the same time in either the forward or backward revolution of the wheel.

In both Figs. 3 and 4 we have shown, as at H, one of the bells with the clapper-arms F, similar to those shown in Figs. 1 and 2; but it will be seen and understood that by reason of the bells being secured to the tire instead of to the side of the wheel the doubled portion *p* will project laterally instead of downward and will strike or be tripped by the obstruction B in the revolution of the wheel. It is apparent by reference to the drawings that when the projections *c* are tripped by the obstruction B that the bells will all be struck at the same time, and as each bell may have a different pitch the music of a chime may be produced. It is also obvious that the construction shown in Figs. 3 and 4 may be applied to bicycles or velocipedes, and that the forked portion thereof which strides the wheel will be the obstruction B, which is now represented as a handle.

Having thus fully described our invention, what we claim as new, and desire to secure by Letters Patent, is—

1. In bell or chime attachments for wheels, the combination of a wheel having a series of bells secured thereto and mounted on an axle having movable projections *b*, and the clapper-arms F, having the doubled portion *p* and clapper *g*, all constructed, arranged, and operating substantially as shown and described, and for the purpose set forth.

2. In bell or chime attachments for wheels, the combination of a wheel having one or more bells secured thereto with the clapper-arms F, each having one end secured at the rear or convex portion of the bells *a* and being doubled back upon itself, as at *p*, and having a clapper *g*, whereby the bell is strided by the arm, and the clapper is caused to strike by means of an obstruction on the axle, substantially as and for the purpose set forth.

In testimony whereof we have hereunto set our hands and seals this 14th day of February, 1891.

ALBERT E. LYTLE. [L. S.]
  BYRON K. COWLES. [L. S.]

Witnesses:
  CHAS. E. GORTON,
  CHAS. C. TILLMAN.